United States Patent
Heidemeyer et al.

(10) Patent No.: US 10,767,598 B2
(45) Date of Patent: Sep. 8, 2020

(54) SYSTEM FOR STORING AN AUXILIARY LIQUID AND SUPPLYING SAME TO AN INTERNAL COMBUSTION ENGINE

(71) Applicant: KAUTEX TEXTRON GMBH & CO. KG, Bonn (DE)

(72) Inventors: Timm Heidemeyer, Cologne (DE); Hartmut Wolf, Koenigswinter (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 83 days.

(21) Appl. No.: 16/076,872

(22) PCT Filed: Aug. 2, 2016

(86) PCT No.: PCT/EP2016/068470
§ 371 (c)(1),
(2) Date: Dec. 10, 2018

(87) PCT Pub. No.: WO2017/137101
PCT Pub. Date: Aug. 17, 2017

(65) Prior Publication Data
US 2019/0107080 A1    Apr. 11, 2019

(30) Foreign Application Priority Data

Feb. 9, 2016 (DE) .................... 10 2016 201 943

(51) Int. Cl.
| | | |
|---|---|---|
| F02M 25/022 | (2006.01) | |
| F01N 3/20 | (2006.01) | |
| F02B 47/00 | (2006.01) | |
| F02D 41/00 | (2006.01) | |
| F02M 25/14 | (2006.01) | |
| F02M 25/025 | (2006.01) | |
| F02M 25/028 | (2006.01) | |

(Continued)

(52) U.S. Cl.
CPC ....... *F02M 25/0224* (2013.01); *F01N 3/2066* (2013.01); *F02B 47/00* (2013.01);
(Continued)

(58) Field of Classification Search
CPC ............ F02M 25/0224; F02M 25/025; F02M 25/028; F01N 3/2066; F02B 47/00
See application file for complete search history.

(56) References Cited

U.S. PATENT DOCUMENTS

| | | |
|---|---|---|
| 9,279,352 B2 | 3/2016 | Hao |
| 2013/0000743 A1* | 1/2013 | Crary .................... F01N 3/2066 137/15.04 |
| 2019/0040819 A1 | 2/2019 | Heidemeyer et al. |

FOREIGN PATENT DOCUMENTS

| | | |
|---|---|---|
| CN | 108603464 | 9/2018 |
| DE | 112011104704 | 10/2013 |

(Continued)

OTHER PUBLICATIONS

Office Action from related Chinese Application No. 201680081487.8, dated Jul. 30, 2019. English translation attached.
(Continued)

*Primary Examiner* — Kevin A Lathers
(74) *Attorney, Agent, or Firm* — Grossman, Tucker, Perreault & Pfleger, PLLC

(57) ABSTRACT

The invention relates to a system for storing and feeding an auxiliary liquid to an internal combustion engine of a motor vehicle or to parts of the internal combustion engine of the motor vehicle, having a storage vessel for the fluid, having at least one delivery pump for the fluid, and having at least one line system comprising an inflow to a consumer and a return flow into the storage vessel, the system comprising a connector module which is inserted into an opening of the storage vessel, the connector module having fluid ducts which communicate with the storage vessel and are connected to an inflow line and to a return flow line of the line system, and the connector module comprising a module block which is configured as a thermally conductive and/or heatable body.

20 Claims, 9 Drawing Sheets

(51) Int. Cl.
*F02M 25/03* (2006.01)
*F02D 41/04* (2006.01)

(52) U.S. Cl.
CPC ....... *F02D 41/0025* (2013.01); *F02M 25/025* (2013.01); *F02M 25/028* (2013.01); *F02M 25/03* (2013.01); *F02M 25/14* (2013.01); *F01N 2610/10* (2013.01); *F01N 2610/1406* (2013.01); *F01N 2610/1486* (2013.01); *F01N 2610/1493* (2013.01); *F02D 41/042* (2013.01); *Y02A 50/2325* (2018.01)

(56) References Cited

FOREIGN PATENT DOCUMENTS

| | | |
|---|---|---|
| EP | 1925354 | 5/2008 |
| FR | 2939481 | 6/2010 |
| GB | 2274279 A * | 7/1994 |
| JP | S5514967 | 2/1980 |
| JP | S5899648 | 6/1983 |
| JP | S606866 | 2/1985 |
| JP | 2008115784 | 5/2008 |
| WO | 2010/128531 | 11/2010 |

OTHER PUBLICATIONS

Office Action from related Chinese Application No. 201680081487.8, dated Feb. 27, 2019. English translation attached.
English translation of International Search Report dated Nov. 8, 2016, received in corresponding PCT Application No. PCT/EP2016/068470.
Office Action from related Indian Application No. 201827031883, dated Dec. 19, 2019. English translation attached.

* cited by examiner

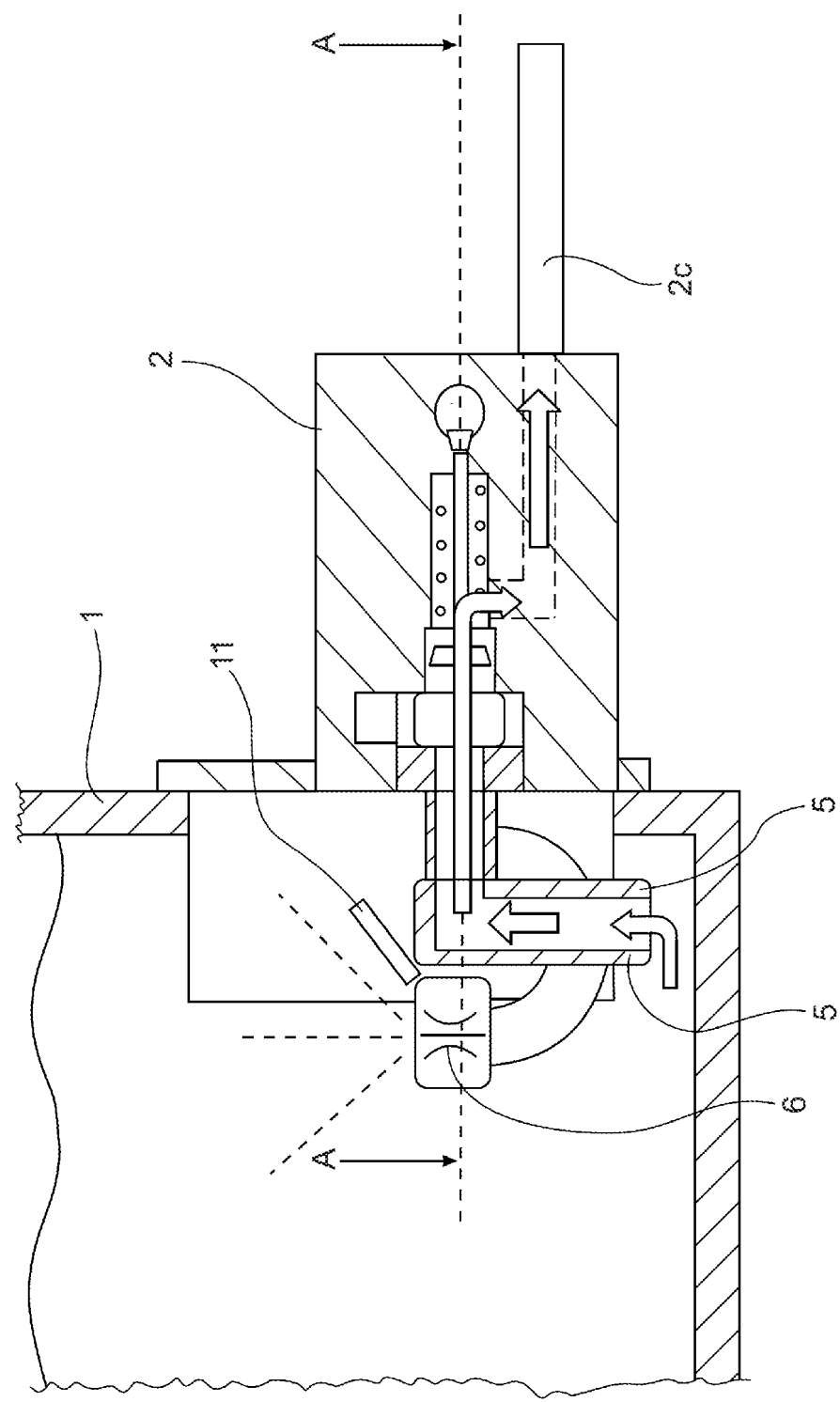

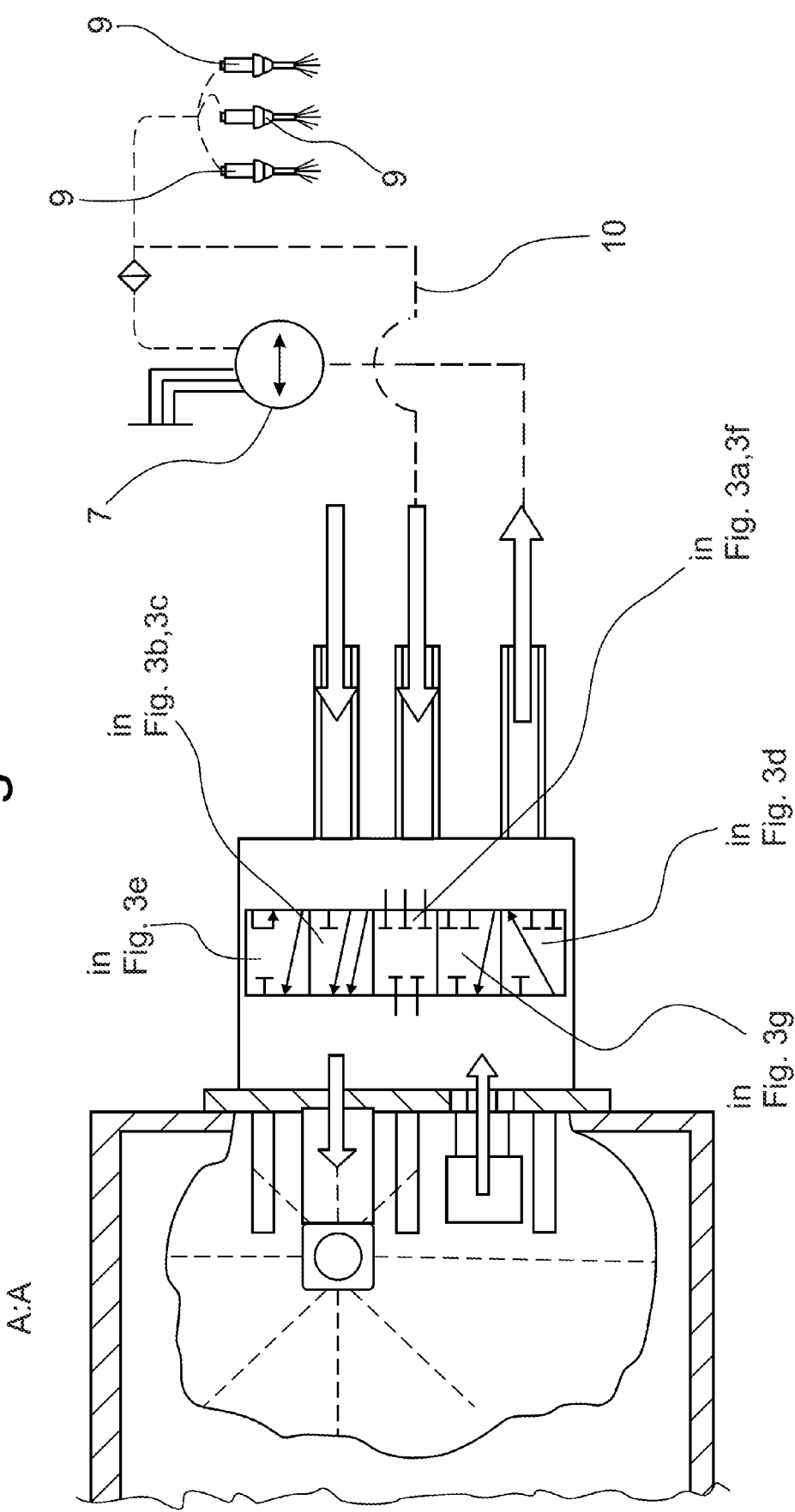

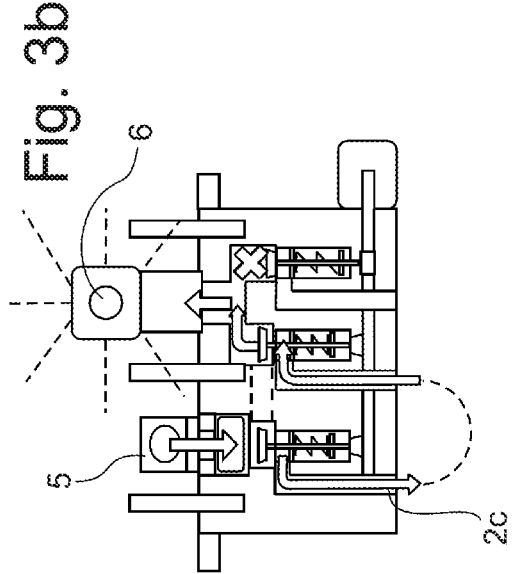
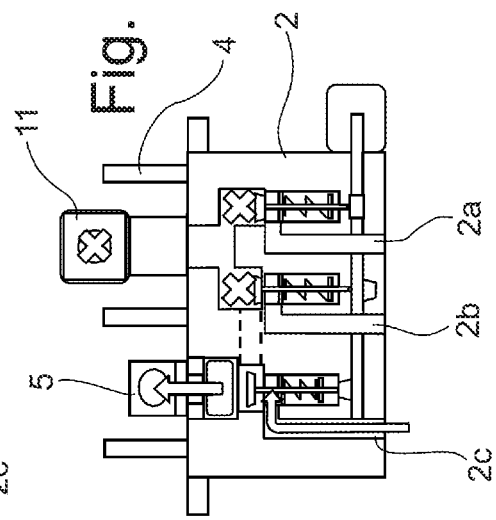
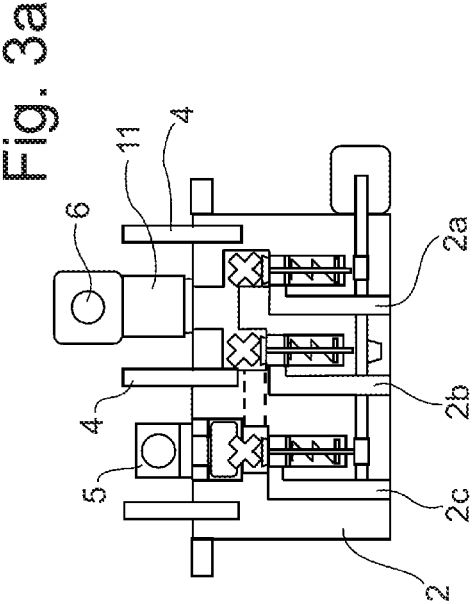
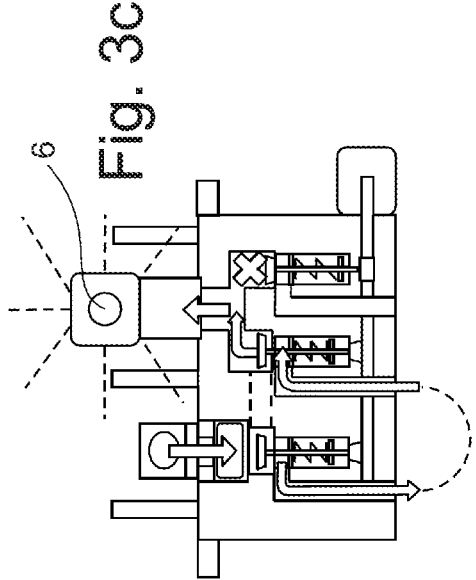

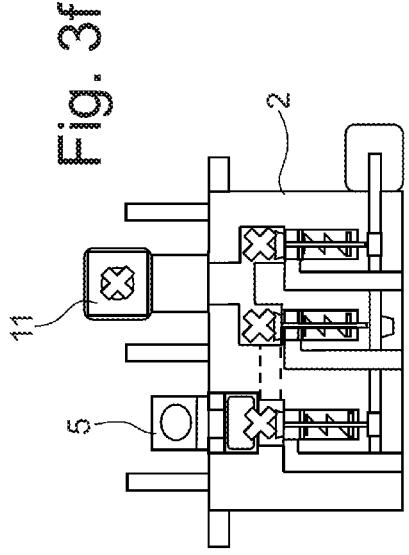
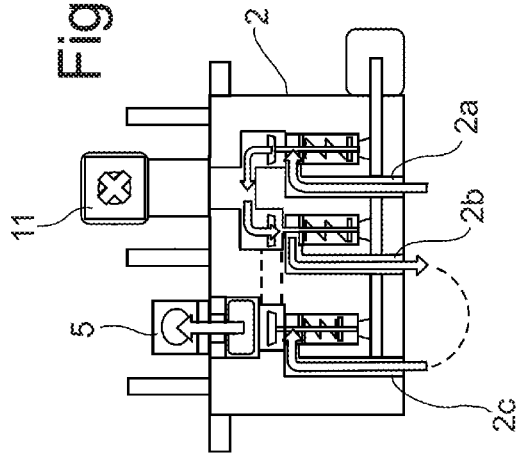
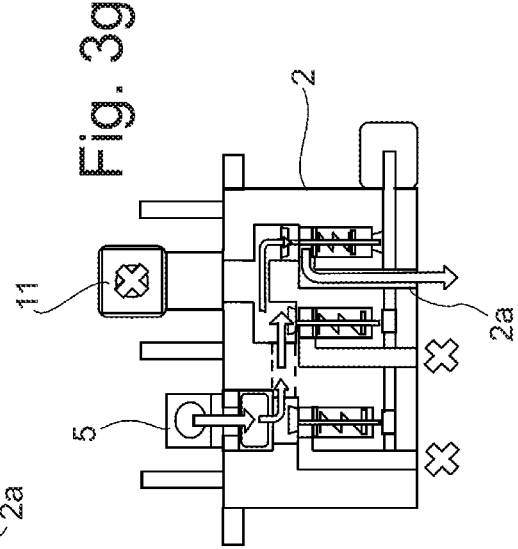

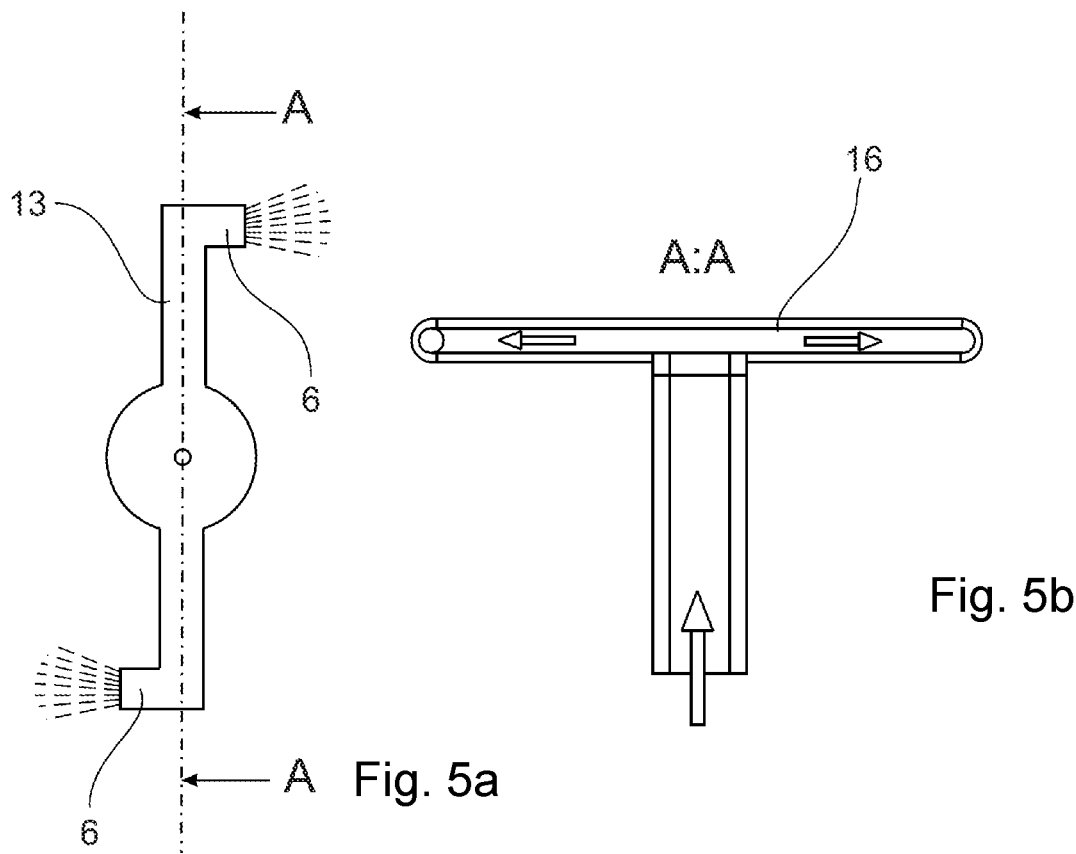
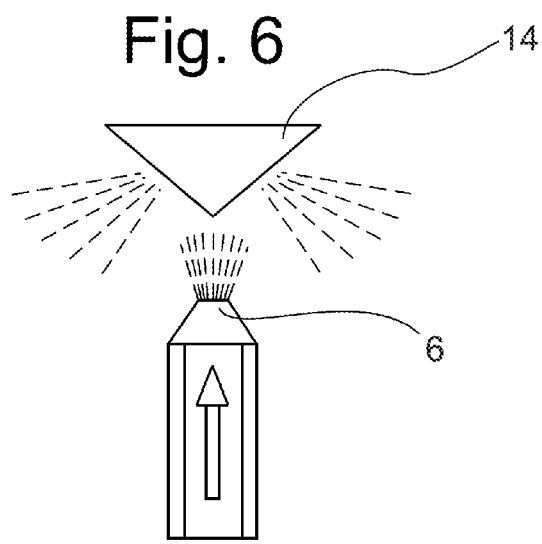

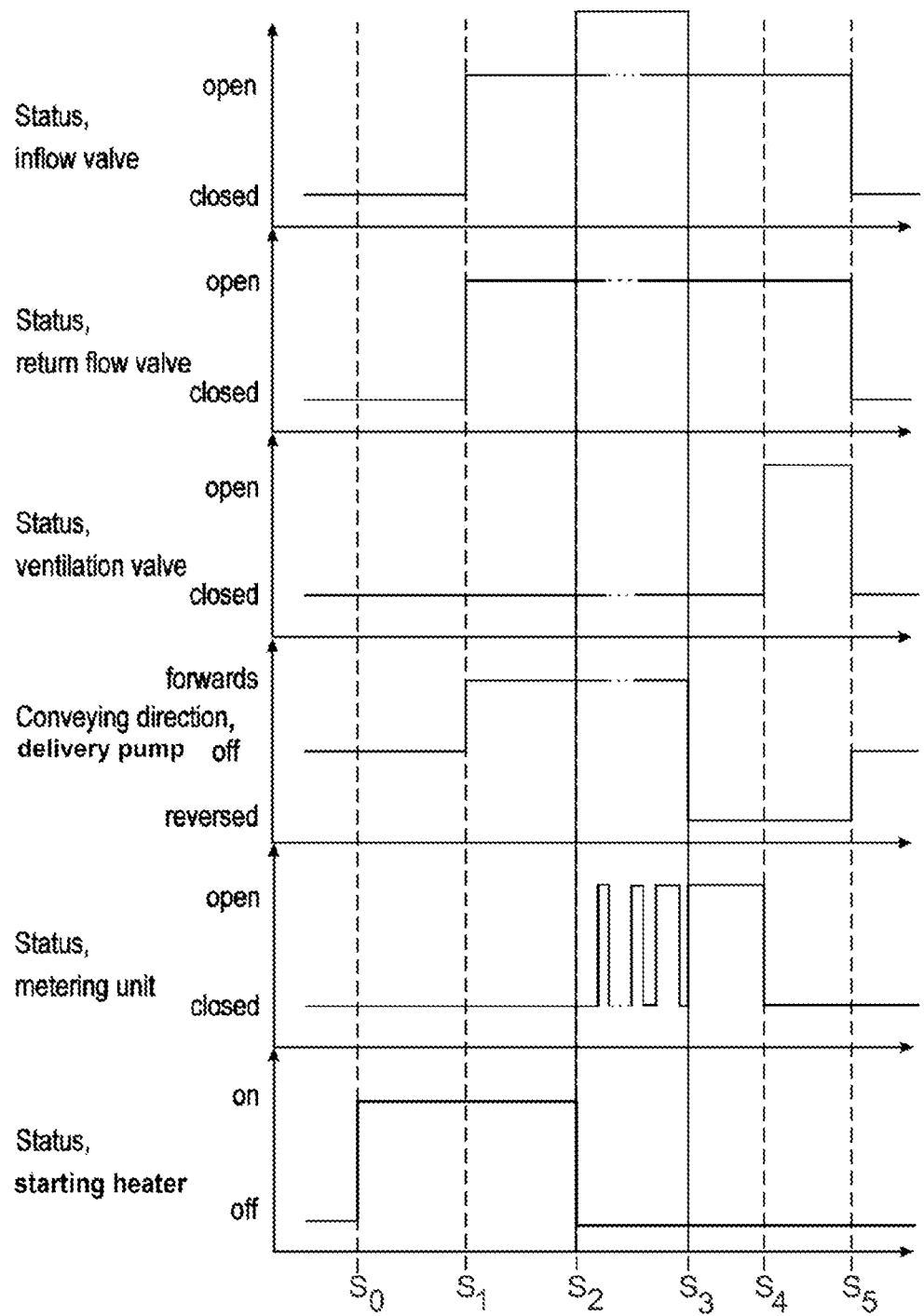

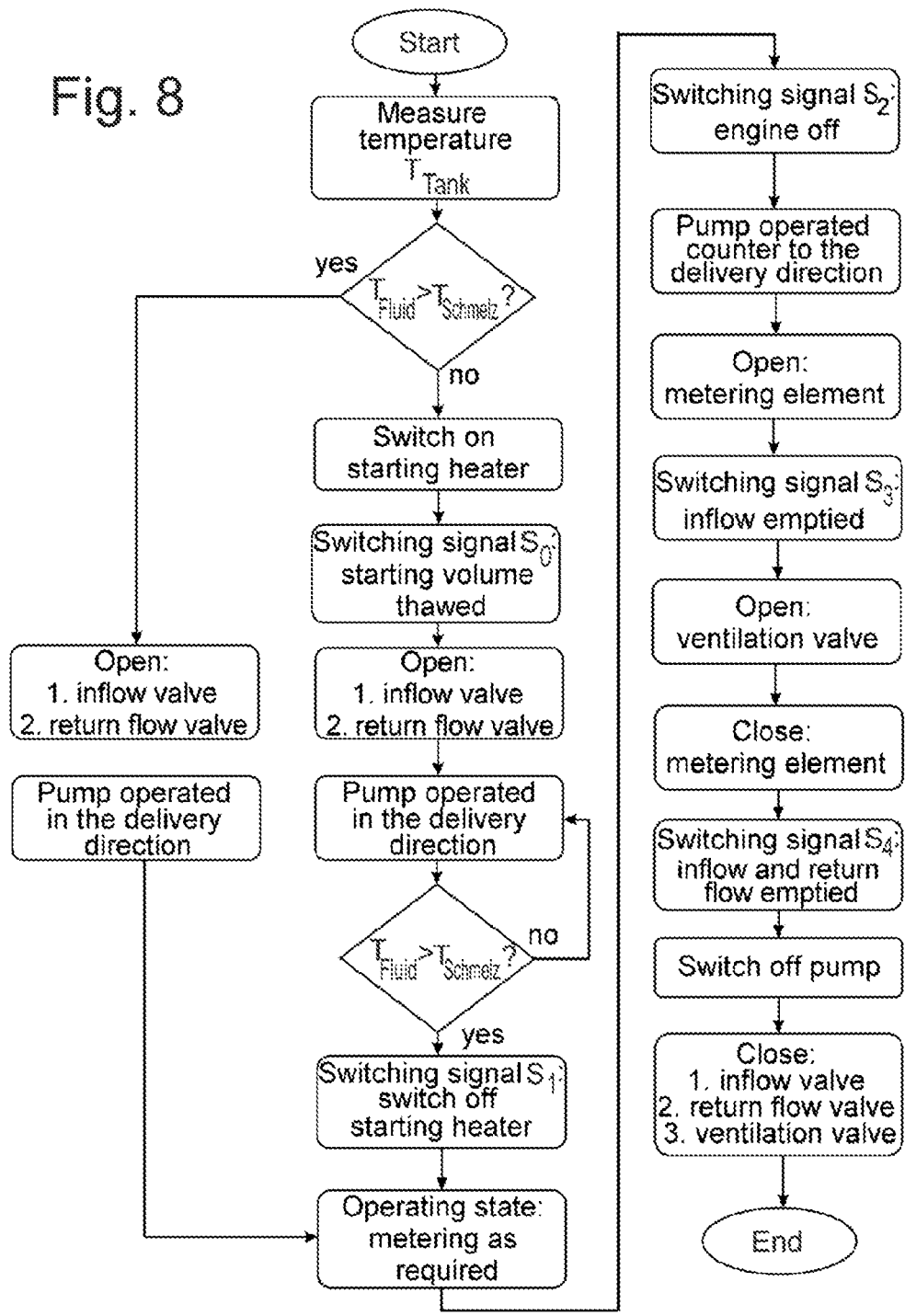

SYSTEM FOR STORING AN AUXILIARY LIQUID AND SUPPLYING SAME TO AN INTERNAL COMBUSTION ENGINE

FIELD

The invention relates to a system for storing and feeding an auxiliary liquid to an internal combustion engine of a motor vehicle or to parts of the internal combustion engine of the motor vehicle.

Furthermore, the invention relates to a method for operating a system of this type. Finally, the invention relates to a connector module for a system for storing and feeding an auxiliary liquid to an internal combustion engine of a motor vehicle or to parts of the internal combustion engine of the motor vehicle.

In particular, the invention relates to a water injection system for the internal combustion engine of a motor vehicle. Moreover, the invention relates to a heatable module for a water injection tank as a storage vessel of the above-described system.

BACKGROUND

In the case of water injection systems for motor vehicles, both the storage vessel and also valves and lines can freeze. Here, ice can lead to damage within the storage vessel or within the lines as a result of expansion, and can considerably lengthen the time until the system is ready for use. An above-described system has to be capable of being used within a very short time after starting of the internal combustion engine.

SUMMARY

The invention is therefore based on the object of providing a system which complies with said requirements.

The system in accordance with the invention comprises a storage vessel for the fluid, at least one delivery pump for the fluid, and at least one line system, comprising an inflow to a consumer and a return flow into the storage vessel. The storage vessel can be configured as a water vessel. As an alternative, however, the storage vessel can also be configured as a storage vessel for an aqueous urea solution which is provided for exhaust gas aftertreatment to an internal combustion engine.

The system can comprise one or more consumers, for example as a metering unit with a plurality of injection nozzles, which inject the auxiliary liquid into the intake section of an internal combustion engine, into the combustion chamber of an internal combustion engine, or into the exhaust gas section of an internal combustion engine.

The problem which is depicted at the outset is solved by way of the provision of a compact heatable connector module which ensures at least one of the following functions:
1. Possibility of emptying the liquid from the storage vessel and/or from the inflow line and the return flow line and/or from the injection nozzle or nozzles in the case of the shutdown of the internal combustion engine in order to avoid ice formation.
2. Thawing of a sufficient part of the volume of the storage vessel for the "cold starting phase".
3. Heatability of provided valves.

Furthermore, it is provided according to the invention that the connector module is configured as a closure body for an opening of the storage vessel. The connector module can be arranged, for example, laterally in the lower third of the storage vessel, preferably in such a way that a removal line opens into the storage vessel as close as possible to the bottom of said storage vessel.

The connector module preferably comprises means for expanding the return flow of the fluid within the storage vessel.

The connector module according to the invention can comprise, for example, an expansion nozzle or distributor nozzle for a return flow of the auxiliary liquid. In the case of a water injection system, the return flow is approximately 30 l/h at a pressure of approximately 7 bar. The return flow stream which contains significant thermal energy (175 W at $\Delta T$ 5K) is utilized according to the invention for thawing the storage vessel and can be injected against ice which is perhaps situated within the storage vessel, for example by means of the return flow nozzle which is provided on the connector module on the vessel side.

In one preferred variant of the invention, the connector module itself can be configured as a heating body or can be heated electrically. To this end, the connector module can be provided with resistance heating elements in the form of NTCs or in the form of PTCs. As an alternative, it can be provided that the connector module is heated inductively.

A preferably electric heater of the connector module or of the thermally conducting body/heating body of the connector module can be provided for thawing fluid which has perhaps frozen within the storage vessel during a starting phase of the internal combustion engine, during which there is not yet any return flow of the fluid.

The connector module preferably comprises a ventilation connector which can be activated operably and upstream of which a filter is preferably connected. As a result, it is possible to empty the liquid from the storage vessel and/or from the inflow line and/or from the return flow line and/or from the injection nozzles in the case of a shutdown of the internal combustion engine.

In order for it to be possible for the inflow line and the return flow line of the line system to be ventilated actively, the connector module can comprise a multiway valve or can be configured as a multiway valve.

The connector module is preferably configured as a five/four-way valve for realizing the required switching positions.

The connector module expediently comprises an electric defrosting heater, and the thermally conducting body is expediently configured as a heating body of the electric defrosting heater.

It is one independent concept of the invention to provide a system for storing and feeding an auxiliary liquid to an internal combustion engine of a motor vehicle or to parts of the internal combustion engine of the motor vehicle, in the case of which system emptying or ventilating both of the return flow line and of the inflow line and possibly also draining of the storage vessel is/are possible for servicing purposes.

The system can comprise a reversible delivery pump which is capable to this end of delivering even compressible media such as air. Emptying or ventilating of the line system can take place by virtue of the fact that the delivery pump is operated in the reverse direction until the connector module draws air from the surroundings via a ventilation connector. The liquid which is situated in the inflow is conveyed back into the storage vessel through the inflow. Here, air from the surroundings passes via the ventilation connector of the connector module into the return flow line. The air which enters there presses the liquid out of the return flow line via the delivery pump, possibly via a filter which is connected in between, into the inflow line and into the storage vessel, until the line system is emptied or ventilated. This operation can be carried out after every shutdown of the internal combustion engine, to be precise optionally also in a manner which is dependent on the ambient temperature.

The system preferably comprises means for controlling the ventilation and/or emptying of the line system in a manner which is dependent on the operating state of the internal combustion engine and/or in a manner which is dependent on the ambient temperature and/or in a manner which is dependent on the fluid temperature and/or in a manner which is dependent on the delivery pressure in the system.

The connector module can be fastened both to the storage vessel side face and to the storage vessel underside. The connector module can be inserted, for example, into a bottom-side opening of the storage vessel.

If the module is attached on the side face of the storage vessel, the extraction point can be protected by means of a suitable siphon against water which enters after the line flushing phase.

A check valve can be provided in the return flow line in the storage vessel or upstream of or at the opening thereof into the storage vessel, which check valve prevents liquid being sucked back out of the storage vessel into the line system upon the ventilation and/or emptying of the system.

Furthermore, the invention relates to a method for operating a system for storing and feeding an auxiliary liquid to an internal combustion engine of a motor vehicle, having a storage vessel for the fluid, having at least one delivery pump for the fluid, and having at least one line system comprising an inflow to a consumer and a return flow into the storage vessel, ventilation and/or emptying of the line system being provided in each case after shutdown of the internal combustion engine and preferably in a manner which is dependent on the ambient temperature.

Finally, the invention relates to a heatable connector module for a water injection tank as a storage vessel for a system for storing and feeding water to an internal combustion engine of a motor vehicle, the connector module being configured as a closure body for an opening of a storage vessel, the connector module having fluid ducts which communicate with the storage vessel and can be connected to an inflow line and to a return flow line of a line system, and the connector module comprising a module block which is configured as a thermally conductive and/or heatable body and which is preferably configured as a multiway valve with a ventilation connector.

BRIEF DESCRIPTION OF THE DRAWINGS

One exemplary embodiment of the invention will be described in the following text using the appended drawings, in which:

FIG. 1a shows a partial sectional view through a storage vessel having a connector module in accordance with the invention;

FIG. 1b shows a view along the arrows a-a in FIG. 1a;

FIG. 2 shows a view which corresponds to FIG. 1b and in which the objective switching functions of the multiway valve are shown symbolically;

FIGS. 3a-g show different operating states of the system which are illustrated in each case by way of different switching states of the multiway valve;

FIG. 4b shows a plan view of the impeller wheel which is shown in FIG. 4a;

FIG. 5a shows a plan view of a rotatable nozzle assembly which is configured as a water reaction wheel;

FIG. 5b shows a side view of the nozzle assembly which is shown in FIG. 5a;

FIG. 6 shows a side view of an expansion nozzle with a deflector body (conical distributor) which is arranged in front of it;

FIG. 7 shows a diagrammatic graphic illustration of the different operating states of the system; and FIG. 8 shows a program flow chart which illustrates the diagrammatic sequence of different operating cycles of the system.

DETAILED DESCRIPTION

Figure 1B:
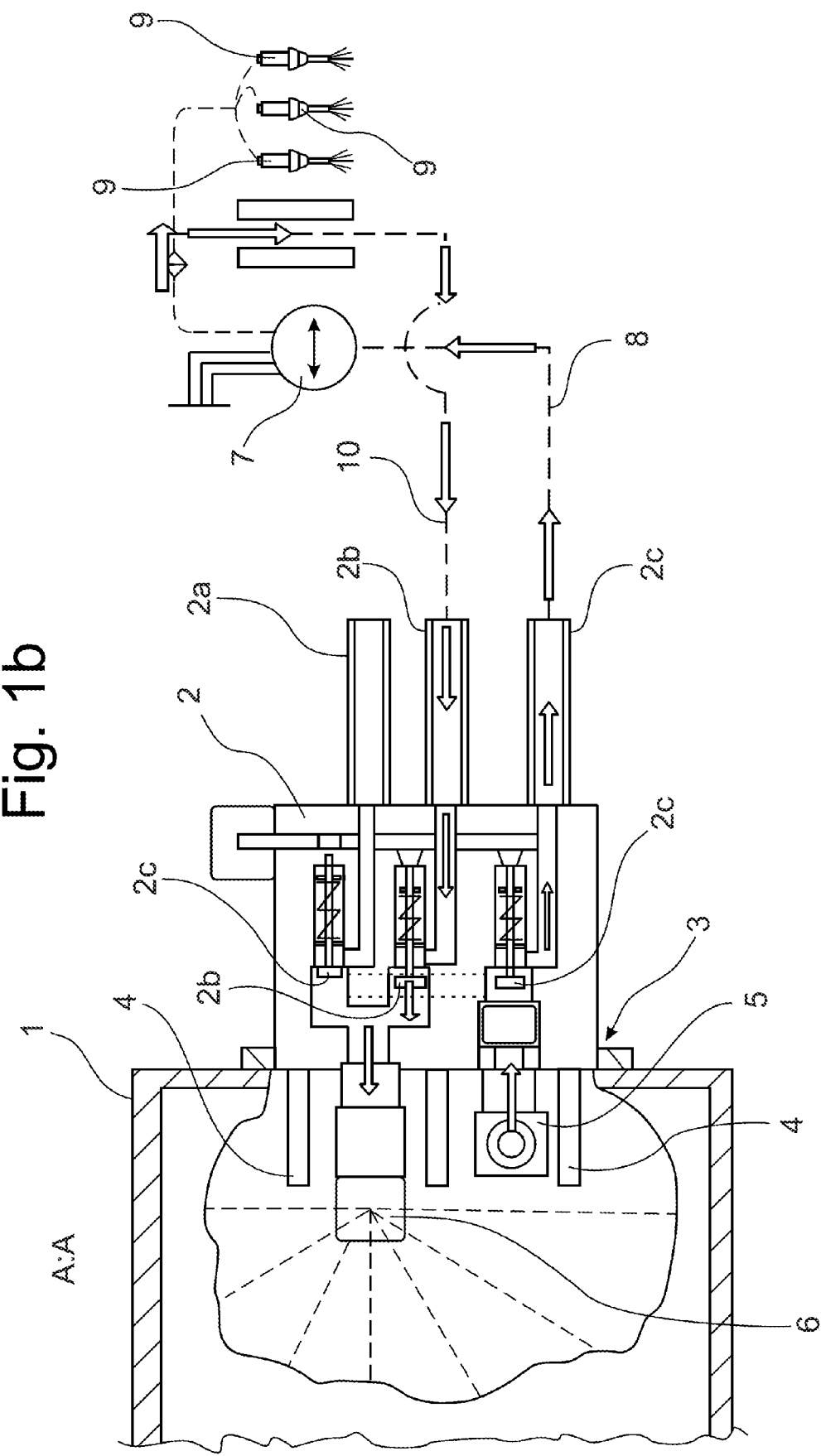

Reference will be made first of all to FIG. 1b. FIG. 1b shows part of a storage vessel 1 and the connector module 2 which is connected to the storage vessel and which has a ventilation connector 2a, a return flow connector 2b and an inflow connector 2c. The connector module 2 is configured as a closure body for an opening 3 in the storage vessel 1. The connector module 2 comprises a module body or module block which is configured as a thermally conductive body and which comprises thermally conducting elements 4 which extend into the volume of the storage vessel 1. The thermally conducting elements 4 serve as a heating body which is part of an electric defrosting heater.

As can also be seen from FIG. 1a, the connector module 2 comprises, on the vessel side, an intake connector 5 and an expansion nozzle 6 which is configured as a distributor nozzle for expanding and returning the return flow.

The intake connector 5 which defines an extraction point within the storage vessel 1 forms a riser pipe or a siphon which protects an inflow line against inflowing water after emptying of the system, as will be described in the following text.

The connector module 2 can be heated electrically, for example inductively or by means of at least one electrically contacted heating element.

The system comprises a reversible delivery pump 7 which feeds water via the inflow line 8 from the storage vessel 1 to a plurality of injection nozzles 9 as consumers via a distributor. The water which is not injected is conveyed back into the storage vessel 1 via a return flow line 10 and the return flow connector 2b, the pressurized water being distributed upward within the storage vessel via the expansion nozzle 6. The heat of the hot return flow is transmitted via the thermally conductive module block and via the thermally conducting bodies 4 into the stored liquid.

Should a cavity be formed within the fluid which has frozen in the storage vessel 1 during the starting phase of the internal combustion engine, thawing of the remaining ice takes place via a spray cone of the return flow, which spray cone is directed upward in the installed position of the system.

As can be gathered, in particular, from FIG. 2, the connector module is configured as a five/four-way valve (five switching positions/four paths).

The different switching positions or operating phases of the system are shown in FIG. 3. The connector module comprises a ventilation valve 2A, an inflow valve 2C and a return flow valve 2B.

FIG. 3a illustrates an operating phase of the system, in which operating phase the connector module 2 is operated as a heating body (electric heater), the heat which is introduced into the storage vessel 1 via the thermally conducting bodies 4 being utilized to thaw the ice which adjoins the connector module directly on the vessel side. After said first thawing phase has ended, in the case of which the multiway valve is situated in the middle position in accordance with FIG. 2 and all connectors are closed, water is then also removed via the intake connector 5 with electric heating of the connector module (FIG. 3b) and is delivered to the injection nozzles 9 via the inflow connector 2c and the inflow line 8. A return flow is produced here, which is introduced into the storage vessel 1 by means of the expansion nozzle 6.

FIG. 3c shows a further operating phase of the system, in the case of which further operating phase no electric heating operation is provided; otherwise, however, the switching position of the multiway valve corresponds to that in FIG. 3b.

FIG. 3d shows an operating phase of the system, in the case of which operating phase the injection nozzles 9 are first of all flushed, for which reason the conveying direction of the delivery pump 7 is reversed in the case of open injection nozzles 9 and the intake connector 5 is connected to the inflow connector 2c.

In this operating phase, a sealing flap 11 closes the expansion nozzle 6. The return flow connector 2b and the ventilation connector 2a are closed, and the delivery pump 7 first of all draws the water which prevails upstream of the injection nozzles 9 back into the storage vessel 1. Afterward, the injection nozzles 9 are closed and the ventilation connector 2a is opened.

In order to prevent contaminants being introduced into the line system in the case of the rinsing of the injection nozzles 9, a filter can be provided in the return flow line 10.

FIG. 3e shows a further operating phase, in the case of which the inflow line 8 is ventilated or flushed. Here, the ventilation connector 2a is open toward the surroundings, and the delivery pump 7 can draw air via the ventilation connector 2a into the return flow line 10, to be precise until all of the liquid is conveyed out of the system back into the storage vessel 1 via the inflow line 8.

FIG. 3f illustrates a switching position of the multiway valve in the case of a completely shut down, ventilated system.

Finally, FIG. 3g illustrates the switching position of the multiway valve if the storage vessel 1 is to be emptied for servicing purposes.

Furthermore, reference is made to FIG. 7 in respect of the method of operation of the system; $S_0$, $S_1$, $S_2$, $S_3$, $S_4$ and $S_5$ denote the different switching positions of the multiway valve which are shown on a time axis. The switching states of the valves and the operating states of the delivery pump 7 and the metering unit (injection nozzles 9) are shown on the ordinate. The time period up to the switching position $S_0$ is the idling state of the system. In this state, the starting heater is off, and the metering unit or the injection nozzles 9 are closed. The delivery pump 7 is off, and the ventilation valve 2A, the return flow valve 2B and the inflow valve 2C are closed.

The switching position $S_0$ is that state of the system in the case of which the electric thawing operation is carried out without circulation of the fluid. In the case of switching position $S_1$, thawing is brought about by way of circulation of the fluid; the switching position $S_2$ exists in the case of operation of the metering unit; the switching position $S_3$ initiates the ventilation of the inflow line 8; the switching position $S_4$ initiates the ventilation of the return flow line 10; and the switching position $S_5$ is assumed in the case of idling of the system. The different operating states of the starting heater, the metering unit, the delivery pump 7, the ventilation valve 2A, the return flow valve 2B and the inflow valve 2C can be read via the plotted graphs.

In order to bring about a more homogeneous distribution of the heated return flow volume of the fluid within the storage vessel 1, it is provided in accordance with one variant of the invention to arrange an impeller wheel 12 in front of the expansion nozzle 6, which impeller wheel 12 is mounted rotatably, can be loaded with the fluid, and can be driven via the fluid which exits from the expansion nozzle 6.

Figure 4B:
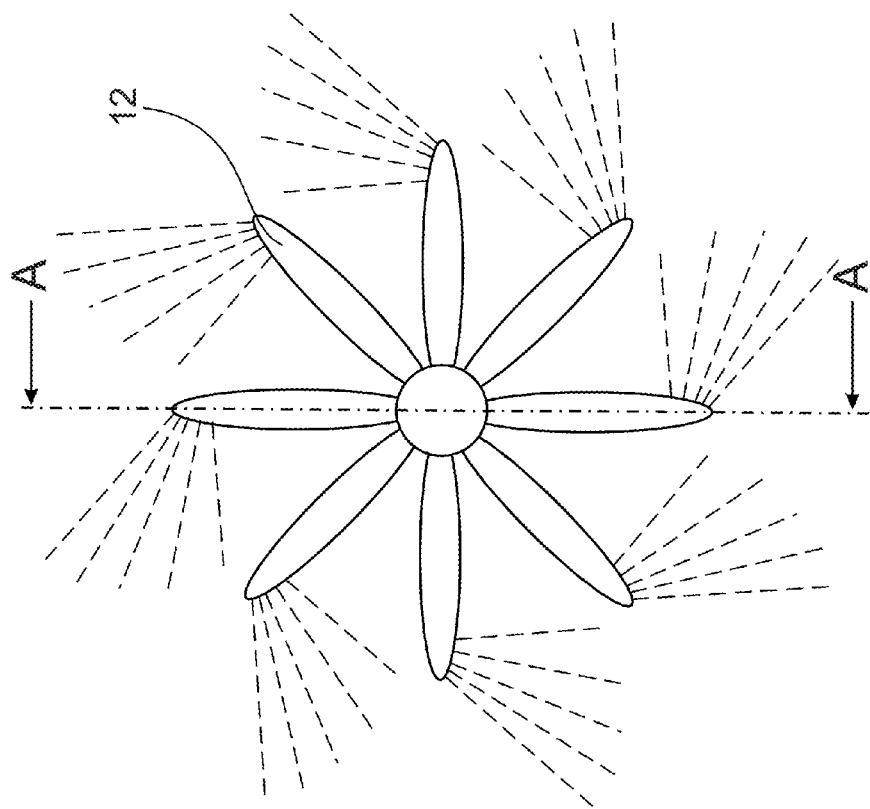
Figure 4A:
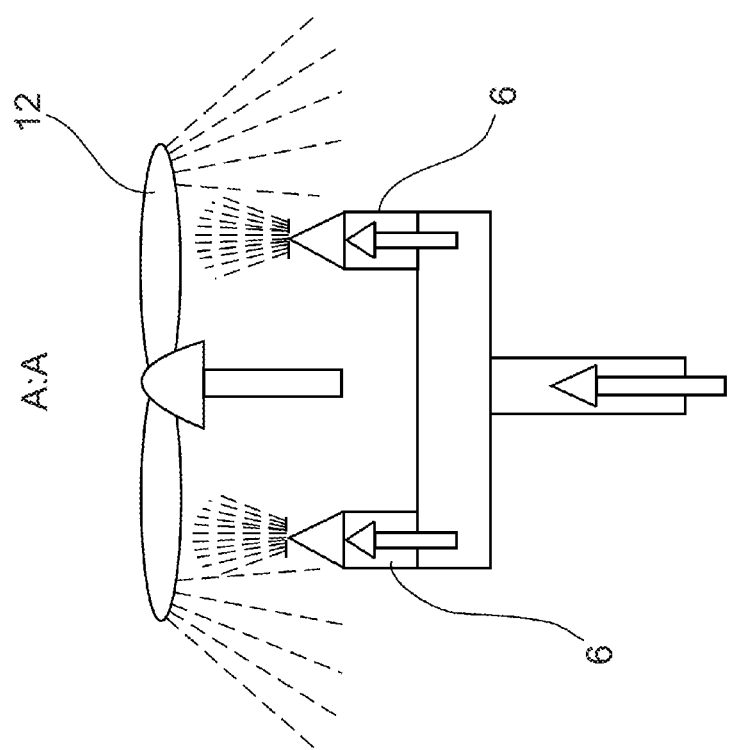
FIG. 4a shows a view of an arrangement of expansion nozzles with an impeller wheel which is arranged in front of them.

As shown, in particular, in FIG. 4a, it is provided in the case of said variant of the system according to the invention that two expansion nozzles 6 are connected to a return flow distributor which is configured as a Y-shaped distributor.

The impeller wheel 15 comprises two vanes which in each case have a hydraulically active profile. The expansion nozzles which are arranged symmetrically with regard to the impeller wheel expand the fluid in the direction of the impeller wheel 12 and bring about driving of the impeller wheel 12 which is set in rotation by way of the dynamics of the fluid. The spray cone which exits in each case from the expansion nozzle 6 is distributed over a comparatively large area within the storage vessel 1 by way of the rotation of the impeller wheel 12.

A further variant of the system in accordance with the invention is shown in FIG. 5 which shows a rotatable nozzle assembly 13, on which two expansion nozzles 6 are arranged which in each case have outlet openings which point in diametrically opposed directions. As a result, pulses which are opposed in each case are generated during the expansion of the fluid, which pulses introduce a turning moment into the nozzle assembly 13 and set it in rotation as a consequence. As a result, a homogeneous and large-area distribution of the expanded, heated fluid is generated in the manner of a lawn sprinkler.

A further variant of the system in accordance with the invention is shown in FIG. 6. Said system comprises an expansion nozzle 6, upstream of which a deflector body 14 is arranged. The deflector body 14 is configured as a cone/prism, the tip of the cone pointing in the direction of the expansion nozzle 6 and being arranged symmetrically with regard to an outlet opening of the expansion nozzle 6. In this way, the deflector body 14 reflects and multiplies the spray cone of the fluid which exits from the expansion nozzle 6.

In the case of each of the exemplary embodiments which are shown in FIGS. 4 to 6, means are provided for increasing/distributing the spray cone of the expanded fluid, which spray cone exits from one or a plurality of expansion nozzles 6, which means are arranged directly upstream of the relevant expansion nozzle 6.

List of Designations:
   1 Storage vessel
   2a Ventilation connector
   2b Return flow connector
   2c Inflow connector
   2A Ventilation valve
   2 B Return flow valve
   2 C Inflow valve
   3 Opening in the storage vessel 1
   4 Thermally conducting body
   5 Intake connector
   6 Expansion nozzle
   7 Delivery pump 8 Inflow line
9 Injection nozzles
10 Return flow line
11 Sealing flap
12 Impeller wheel
13 Nozzle assembly
14 Deflector body

What is claimed is:

1. A system configured to store and feed an auxiliary liquid comprising water to an internal combustion engine of a motor vehicle or to parts of the internal combustion engine of the motor vehicle, comprising:
a storage vessel for the auxiliary liquid, having at least one delivery pump for the auxiliary liquid, and having at least one line system comprising an inflow line to a consumer and a return flow line into the storage vessel,
a connector module inserted into an opening of the storage vessel, the connector module having fluid ducts which communicate with the storage vessel and are connected to the inflow line and to the return flow line of the line system,
the connector module comprising a module block having a thermally conductive and/or heating body configured to heat the auxiliary liquid,
the connector module being configured as a switchable multiway valve which, in a case of corresponding actuation, makes ventilation and/or emptying of the line system possible,
wherein the module block comprises thermally conducting elements which extend into a volume of the storage vessel, the thermally conducting elements being spaced apart from the line system.

2. The system as claimed in claim 1, wherein the connector module is configured to expand a return flow of the auxiliary liquid within the storage vessel.

3. The system as claimed in claim 1, wherein the connector module comprises a ventilation connector which is activatable operably and upstream of which a filter is connected.

4. The system as claimed in claim 1, wherein the connector module comprises a heater, and the thermally conductive body is configured as a heating body of the heater.

5. The system as claimed in claim 1, wherein the system is configured to ventilate and/or empty the line system after a shutdown of the internal combustion engine.

6. The system as claimed in claim 1, wherein the system is configured to control ventilation and/or emptying of the line system dependent on an operating state of the internal combustion engine.

7. The system as claimed in claim 1, further comprising an extraction point of the inflow line, provided in the storage vessel, arranged upstream of a siphon or a riser pipe in the inflow line.

8. The system as claimed in claim 1, wherein a check valve is provided in the return flow line, the check valve configured to prevent auxiliary liquid being sucked back out of the storage vessel into the line system upon a ventilation and/or emptying of the system.

9. A heatable connector module for a water injection tank as a storage vessel for the system as claimed in claim 1.

10. The system as claimed in claim 1, wherein the system is a water injection system.

11. The system as claimed in claim 1, wherein the system is an aqueous-urea system.

12. The system as claimed in claim 1, wherein the module block is configured to be heated by a return flow of the auxiliary liquid in the return flow line.

13. The system as claimed in claim 1, further comprising a heater, and wherein the module block is configured to be heated by the heater.

14. A method for operating a system configured to store and feed an auxiliary liquid comprising water to an internal combustion engine of a motor vehicle or to parts of the internal combustion engine of the motor vehicle, comprising:
venting and/or emptying of at least one line system are/is provided in each case after a shutdown of the internal combustion engine and dependent on ambient temperature,
wherein the system configured to store and feed the auxiliary liquid comprising water to the internal combustion engine of the motor vehicle or to parts of the internal combustion engine of the motor vehicle comprises,
a storage vessel for the auxiliary liquid, having at least one delivery pump for the auxiliary liquid, and having the at least one line system, the at least one line system comprising an inflow line to a consumer and a return flow line into the storage vessel,
a connector module inserted into an opening of the storage vessel, the connector module having fluid ducts which communicate with the storage vessel and are connected to the inflow line and to the return flow line of the line system,
the connector module comprising a module block having a thermally conductive and/or heating body configured to heat the auxiliary liquid,
the connector module being configured as a switchable multiway valve which, in a case of corresponding actuation, makes ventilation and/or emptying of the line system possible, and
wherein the module block comprises thermally conducting elements which extend into a volume of the storage vessel, the thermally conducting elements being spaced apart from the line system.

15. The system as claimed in claim 13, wherein the heater comprises at least one of a defroster, a heating element or an electric heater.

16. The method as claimed in claim 14, wherein the system is a water injection system.

17. The method as claimed in claim 14, wherein the system is an aqueous-urea system.

18. The method as claimed in claim 14, wherein the module block is configured to be heated by a return flow of the auxiliary liquid in the return flow line.

19. The method as claimed in claim 14, further comprising a heater, and wherein the module block is configured to be heated by the heater.

20. The method as claimed in claim 19, wherein the heater comprises at least one of a defroster, a heating element or an electric heater.

* * * * *